(12) United States Patent
Vuong et al.

(10) Patent No.: US 7,144,514 B2
(45) Date of Patent: Dec. 5, 2006

(54) CYANIDE AND FORMATE DESTRUCTION WITH ULTRA VIOLET LIGHT

(75) Inventors: Dinh-Cuong Vuong, Nederland, TX (US); Byron Von Klock, Beaumont, TX (US)

(73) Assignee: Texaco, Inc., CA (US)

( * ) Notice: Subject to any disclaimer, the term of this patent is extended or adjusted under 35 U.S.C. 154(b) by 0 days.

(21) Appl. No.: 10/237,430

(22) Filed: Sep. 9, 2002

(65) Prior Publication Data

US 2004/0045908 A1 Mar. 11, 2004

(51) Int. Cl.
*C02F 1/32* (2006.01)
*C02F 1/72* (2006.01)

(52) U.S. Cl. ............... 210/748; 210/759; 210/760; 210/904

(58) Field of Classification Search ............ 210/748, 210/754, 758, 759, 760, 767, 904, 908; 422/24; 588/219, 227, 247
See application file for complete search history.

(56) References Cited

U.S. PATENT DOCUMENTS

| | | | | |
|---|---|---|---|---|
| 3,920,547 A | * | 11/1975 | Garrison et al. | 210/748 |
| 4,211,646 A | | 7/1980 | Westbrook et al. | |
| 4,446,029 A | | 5/1984 | Betermier et al. | |
| 4,510,057 A | * | 4/1985 | Rowe et al. | 210/612 |
| 5,238,581 A | * | 8/1993 | Frame et al. | 210/748 |
| 5,348,665 A | * | 9/1994 | Schulte et al. | 210/748 |
| 5,523,001 A | * | 6/1996 | Foeckler et al. | 210/721 |
| 5,573,676 A | * | 11/1996 | Massholder et al. | 210/720 |
| 5,679,257 A | * | 10/1997 | Coate et al. | 210/695 |

FOREIGN PATENT DOCUMENTS

| | | |
|---|---|---|
| JP | 2001347281 | 12/2001 |
| WO | WO 97/22556 | 6/1997 |

OTHER PUBLICATIONS

JP2001347281 A; Dec. 18, 2001; Werz et al., "Method for Treating Wastewater Containing Metal Cyanide" Abstract Only (1 pg).
International Search Report; International Application No. PCT/US03/26230; International Filing Date Aug. 19, 2003; Date of Mailing Jul. 2, 2004; 5 pages.
International Search Report for International Patent Application No. PCT/US03/26230 filed Aug. 19, 2004; 1 pg.

* cited by examiner

*Primary Examiner*—Frank M. Lawrence
(74) *Attorney, Agent, or Firm*—Cantor Colburn LLP

(57) ABSTRACT

A method for substantially reducing cyanide and formate concentrations in gasification wastewater streams comprising first removing suspended solids from the wastewater stream, then adding sufficient hydrogen peroxide to completely oxidize contained cyanide ions and formate ions to form a feed solution, and then irradiating the resultant solution with sufficient UV light so as to substantially reduce said contained cyanide ions and formate ions.

13 Claims, 1 Drawing Sheet

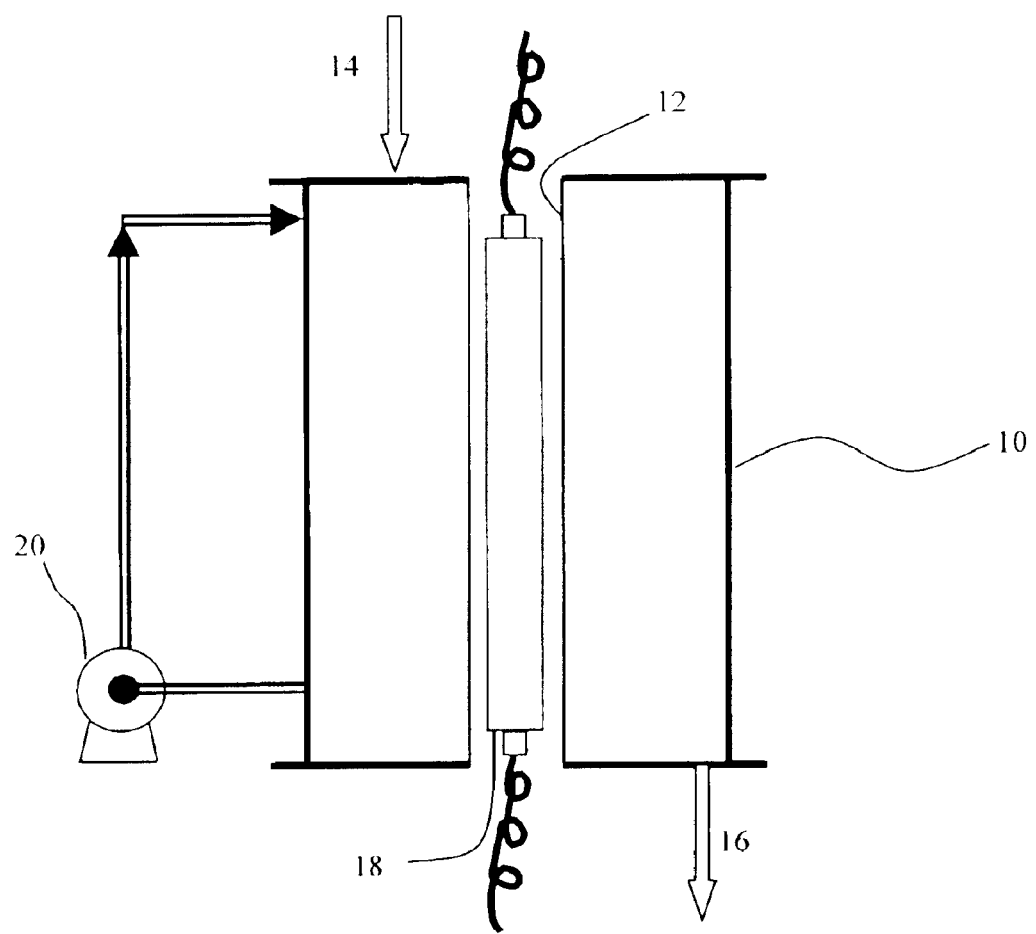

CYANIDE AND FORMATE DESTRUCTION WITH ULTRA VIOLET LIGHT

BACKGROUND OF THE INVENTION

Cyanides in the form of free cyanide salts or cyanide complexes are potentially toxic compounds that do not normally occur in domestic wastewater. Such cyanides are frequently found in industrial waste effluents, such as in wastewater from gasification plants. It is essential that the cyanide and formate levels in these wastewater effluents are controlled, but adequate methods are not presently available, especially for ferricyanide complexes that are stable and resist chemical means for their destruction.

Current federal regulations limit the concentration of cyanide discharge and the chemical oxygen demand on waste water. The common cyanide discharge limit is 0.2 mg/L. There is no specific discharge limit for formate however, formate contributes to COD (chemical oxygen demand). The common COD discharge limit is 120 mg/L.

High pressure, high temperature gasification systems are used to partially oxidize hydrocarbonaceous fuels to recover useful by-products or energy. The partial oxidation reaction is carried out under high temperature and high pressure conditions, converting about 98% to 99.9% of the hydrocarbonaceous feedstock to a synthesis gas containing carbon monoxide and hydrogen, also referred to as synthesis gas or syngas. Carbon dioxide and water are also formed in small amounts. Water is further used as quench water to quench the syngas, to scrub particulate matter from the syngas, and to cool and/or convey particulate waste solids, such as ash and/or slag out of the gasifier. In order to conserve water, gasification units reuse most of the quench water. However, a portion of the water is normally continuously removed as a wastewater stream in order to prevent excessive buildup of solid materials and undesired dissolved solids.

The composition of the wastewater discharged from the gasification system is fairly complex. The main contaminants of gasification wastewater include sulfides, cyanides, suspended solids (soot, ash fines, and metals), ammonias, and formates. The Texaco Gasification Wastewater Treating Process, as generally described in U.S. Pat. No. 4,211,646 the contents of which are hereby incorporated by reference, is currently used in several operating plants. This process utilizes ferrous sulfate and caustic addition, clarification, filtration, steam stripping, and biological treatment to remove the above contaminants. Drawbacks to this process include difficulty in removing cyanides to less than detectable levels and careful attention is required to maintain a food source (formate) for the biotreatment process.

Oxidation processes for treating cyanides in wastewater also exist in the prior art. One commercial process for the destruction of free cyanide ion in wastewater oxidizes cyanide ions with hydrogen peroxide in the presence of a soluble catalyst, such as copper or iron, at a pH of between 8.3 and 11. However, this process has proven to be ineffective in destroying iron cyanide complexes, such as the ferricyanide ion or the ferrocyanide ion, which is typically found in industrial wastewater streams. Another commercial process destroys cyanide ions in an aqueous solution by first adjusting the pH of the solution to between 11 and 12, then irradiating the solution with ultraviolet (UV) radiation, then reducing the solution to between 8 and 11, and finally adding hydrogen peroxide to initiate oxidation. The present invention is intended to improve upon these existing methods.

SUMMARY OF THE INVENTION

A method for substantially reducing cyanide and formate concentrations in gasification wastewater streams includes first removing suspended solids from the wastewater stream, then adding sufficient hydrogen peroxide to completely oxidize contained cyanide ions and formate ions to form a feed solution, and then irradiating the resultant solution with sufficient UV light so as to substantially reduce the contained cyanide ions and formate ions.

BRIEF DESCRIPTION OF THE DRAWINGS

The FIGURE illustrates the UV/$H_2O_2$ test apparatus used in accordance with an embodiment of the invention.

DESCRIPTION OF ILLUSTRATIVE EMBODIMENTS

In one aspect, the method described in this patent relates to an advanced oxidation process for substantially reducing cyanide and formate concentrations in wastewater from a gasification plant. However, other possible uses are contemplated for this method, including its use to substantially reduce cyanide and formate concentrations in any aqueous stream.

The term "substantially reduce" is intended to cover a broad range of cyanide and formate removal. One skilled in the art can appreciate that this invention can be adapted for use with wastewater streams with higher or lower initial formate and cyanide concentrations, and can be adapted for providing higher and lower effluent concentrations, dependent on the user's particular circumstances. One such typical circumstance is the user's ability to blend the effluent of this invention with other treated or untreated wastewater streams to meet specific target concentrations for discharge cyanide and formate levels. "Effluent" is defined to mean the resultant wastewater stream produced after the steps of this invention have been completed. Thus, "effluent concentration" refers to the concentration of a specific molecule or molecules in the effluent.

Formate is the simplest organic acid compound. Its concentration in gasification wastewater ranges from about 500 to about 5,000 mg/L. Theoretically, equal molar oxidant is required for converting formate ion to carbon dioxide and water.

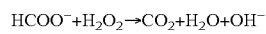
$HCOO^- + H_2O_2 \rightarrow CO_2 + H_2O + OH^-$

It is expected that one skilled in the art can easily determine the theoretical volume of oxidant required to completely oxidize a given cyanide concentration in any aqueous stream based on this 1:1 molar relationship.

Cyanide ion, however, requires five moles of oxidant per mole of cyanide in order to completely oxidize:

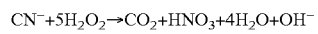
$CN^- + 5H_2O_2 \rightarrow CO_2 + HNO_3 + 4H_2O + OH^-$

Fortunately, the cyanide concentration is typically low in gasification wastewater, ranging from about 1 mg/L to about 20 mg/L. Thus, only small amounts of oxidant are required for theoretically complete cyanide oxidation. It is expected that one skilled in the art can easily determine the theoretical amount of oxidant required to completely oxidize cyanide given the cyanide ion concentration in any aqueous stream based on this 5:1 molar relationship.

This theoretical amount is necessary to oxidize both simple and complex cyanide molecules. Examples of complex cyanides are iron cyanide complexes such as ferrocyanide or ferricyanide, or complexes in which the cyanide groups are replaced with substituents such as water, carbon monoxide, nitrous oxide, or nitric oxide. Furthermore, it is well known to those of skill in the art that complex cyanide oxidation requires UV light radiation for complete oxidation. UV light radiation causes hydroxyl ions (for example) and/or water molecules to replace the cyanide in an iron cyanide complex. The resulting complex is more susceptible to attack by oxidants and is particularly more susceptible to attack by free hydroxyl radicals formed by the exposure of hydrogen peroxide and UV light.

This invention is intended as a commercially viable oxidation technique using ultraviolet (UV) light radiation with the addition of oxidants such as ozone, hydrogen peroxide, chlorine, and other related compounds. The methods associated with this invention can use equipment currently deployed for existing oxidation technology, including offerings by Solarchem, Ultrox, and Peroxidation Systems. It is fully intended by this invention that an "intentional pH adjustment" includes the addition of any substance, other than the oxidant or oxidants used in accordance with this method, that has an impact on the pH of the aqueous solution or wastewater stream being treated.

Experimental trials using the methods described in this invention for cyanide and formate removal from wastewater have been quite successful. The following example discloses one such experimental trial and demonstrates the practical operation and benefit of this invention.

EXAMPLE

A solution containing ammonium formate, potassium ferrocyanide, and hydrogen peroxide was circulated in a 6 liter, 1 kilowatt UV reactor for one hour. The FIGURE generally illustrates the $UV/H_2O_2$ test apparatus. The reactor is defined by the outer reactor walls 10 and a quartz tube inner wall 12. A feed inlet 14 and treated water outlet 16 permit the passage of the water to be treated through the reaction chamber. Inside of the quartz tube is a conventional ultra violet discharge lamp 18. A recirculating system and pump 20 is used to circulate the water being treated in the reactor. The test solution was prepared as indicated in the following table. The reactor was made by Solarchem, which has specific features for UV light radiation.

| Test | 50% $H_2O_2$ added (mL) | Initial Formate (mg/L) | Final Formate (mg/L) | Initial Cyanide (mg/L) | Final Cyanide (mg/L) |
|---|---|---|---|---|---|
| 1 | 30 | 2291 | 1.6 | 46.4 | <0.02 |
| 2 | 50 | 2378 | 0.7 | 54.2 | <0.02 |

The molar ratio of added oxidant was slightly higher than the theoretically required amount. The final formate and cyanide concentrations should comply with most regulatory discharge permits, as previously discussed.

In one embodiment, this invention is employed to substantially reduce cyanide and formate concentrations in a gasification wastewater stream. Suspended solids are removed from the gasification wastewater stream utilizing any well-known solids removal techniques, such as clarification, filtration or a combination of clarification and filtration. An amount of hydrogen peroxide sufficient to completely oxidize contained cyanide ions and formate ions is added to the gasification wastewater stream. Other oxidants can also be used in accordance with this invention, such as chlorine, ozone, and similar compounds that have sufficient oxidative potential to carry out the reaction. Finally, the gasification wastewater and hydrogen peroxide solution is irradiated with sufficient UV light so as to substantially reduce the concentration of contained cyanide ions and formate ions. It is also intended that said oxidant addition and irradiation steps can be performed simultaneously to achieve substantially the same oxidation results. Unlike the prior art, pH is not intentionally adjusted at any step of the present invention for the purpose of aiding the oxidation of contained formates and cyanides. This preferred embodiment intends to reduce formate concentration from less than about 5,000 mg/L in the gasification wastewater to less than about 50 mg/L in the effluent, and to reduce cyanide concentration from less than about 20 mg/L in the gasification wastewater to less than about 0.2 mg/L in the effluent. One skilled in the art can appreciate that this embodiment of the present invention can also be adapted for use with gasification wastewater streams with higher formate and cyanide concentrations, and can also be adapted for providing higher and lower effluent concentrations, such as is prudent when the effluent of this embodiment is blended with other treated or untreated industrial wastewater streams. The minimum molar ratio of hydrogen peroxide per mole of formate for complete oxidation of formate ions in the gasification plant wastewater is about 1.0 and the minimum molar ratio of hydrogen peroxide per mole of cyanide for complete oxidation of cyanide ions in the gasification plant wastewater is about 5.0. However, one of skill in the art can appreciate that higher and lower minimum-ratios can be used to achieve varying degrees of oxidation completeness.

In another embodiment, this invention is employed to substantially reduce cyanide and formate concentrations in industrial wastewater. As with the prior embodiment, the suspended solids are removed from a industrial wastewater stream utilizing any well-known solids removal techniques including clarification, filtration or a combination of clarification and filtration. An amount of hydrogen peroxide sufficient to completely oxidize contained cyanide ions and formate ions is added to the industrial wastewater stream. Other oxidants can also be used in accordance with this invention, such as chlorine, ozone, and other related that have sufficient oxidative potential for carrying out the reaction. Finally, the industrial wastewater and hydrogen peroxide solution is irradiated with sufficient UV light so as to substantially reduce the concentration of contained cyanide ions and formate ions. It is also intended that said oxidant addition and irradiation steps can be performed simultaneously to achieve substantially the same oxidation results. Unlike the prior art, pH is not intentionally adjusted at any step of the present invention for the purpose of aiding the oxidation of contained formates and cyanides. This preferred embodiment intends to reduce formate concentration from less than about 7,500 mg/L in the industrial wastewater to less than about 50 mg/L in the effluent, and to reduce cyanide concentration from less than about 50 mg/L in the industrial wastewater to less than about 0.2 mg/L in the effluent. One skilled in the art can appreciate that this embodiment of the present invention can also be adapted for use with industrial wastewater streams with higher formate and cyanide concentrations, and can also be adapted for providing higher and lower effluent concentrations (such as is prudent when the effluent of this embodiment is blended with other treated or untreated industrial wastewater streams). The minimum molar ratio of hydrogen peroxide per mole of formate for complete oxidation of formate ions in the industrial wastewater stream is about 1.0 and the minimum molar ratio of hydrogen peroxide per mole of cyanide for complete oxidation of cyanide ions in the industrial wastewater is about 5.0. However, one of skill in the art can appreciate that higher and lower minimum ratios can be used to achieve varying degrees of oxidation completeness.

In yet another embodiment, this invention is employed to substantially reduce cyanide and formate concentrations in any aqueous solution. The process is carried out as previsouly described except that the oxidant addition and irradiation steps can be performed simultaneously to achieve substantially the same oxidation results. Unlike the prior art, pH is not intentionally adjusted at any step of the present invention for the purpose of aiding the oxidation of contained formates and cyanides. This preferred embodiment intends to reduce formate concentration to less than about 50 mg/L in the effluent, and to reduce cyanide ion concentration to less than about 0.2 mg/L in the effluent. One skilled in the art can appreciate that this embodiment of the present invention can also be adapted to provide higher and lower effluent concentrations (such as is prudent when the effluent of this embodiment is blended with other treated or untreated aqueous solutions). The minimum molar ratio of hydrogen peroxide per mole of formate for complete oxidation of formate ions in the aqueous solution is about 1.0 and the minimum molar ratio of hydrogen peroxide per mole of cyanide for complete oxidation of cyanide ions in the aqueous solution is about 5.0. However, one of skill in the art can appreciate that higher and lower minimum ratios can be used to achieve varying degrees of formate and cyanide oxidation completeness.

While the above description contains specific apparatus, methods and compositions, however, these specifics should not be construed as limitations on the scope of the invention, but merely as exemplifications of embodiments thereof. Those skilled in the art will envision many other possible variations within the scope of the invention as defined by the claims.

We claim:

1. A method for substantially reducing cyanides and formates contained in an aqueous solution, comprising:
    (a) removing suspended solids from an aqueous solution to create a feed solution;
    (b) adding an oxidant to said feed solution in an amount sufficient to oxidize cyanides and formates contained in said feed solution; and
    (c) irradiating said feed solution containing said oxidant with ultraviolet light sufficient to substantially reduce cyanides and formates contained in said feed solution,
    wherein pH is not intentionally adjusted to aid said method.

2. The method of claim 1 wherein steps (b) and (c) occur simultaneously.

3. The method of claim 1 wherein the oxidant used is selected from the group consisting of hydrogen peroxide, chlorine, and ozone.

4. The method of claim 1 wherein the minimum molar ratio of oxidant per mole of formate in the aqueous solution is about 1.0 and the minimum molar ratio of oxidant per mole of cyanide in the aqueous solution is about 5.0.

5. The method of claim 1 wherein the effluent formate concentration is less than about 50 mg/L and the effluent cyanide concentration is less than about 0.2 mg/L.

6. A method for substantially reducing cyanides and formates contained in industrial wastewater, comprising:
    (a) removing suspended solids from an industrial wastewater stream to create a feed solution;
    (b) adding a sufficient amount of oxidant to said feed solution in order to oxidize cyanides and formates contained in said feed solution; and
    (c) irradiating said feed solution containing said oxidant with sufficient ultraviolet light in order to substantially reduce cyanides and formates contained in said feed solution,
    wherein pH is not intentionally adjusted to aid said method.

7. The method of claim 6 wherein steps (b) and (c) occur simultaneously.

8. The method of claim 6 wherein the initial formate concentration in said industrial wastewater is less than about 7,500 mg/L, and the initial cyanide concentration in said industrial wastewater is less than about 50 mg/L.

9. The method of claim 6 wherein the oxidant used is selected from the group consisting of hydrogen peroxide, chlorine, and ozone.

10. The method of claim 6 wherein the minimum molar ratio of oxidant per mole of formate in the aqueous solution is about 1.0 and the minimum molar ratio of oxidant per mole of cyanide in the aqueous solution is about 5.0.

11. The method of claim 6 wherein the effluent formate concentration is less than about 50 mg/L and the effluent cyanide concentration is less than about 0.2 mg/L.

12. A method for substantially reducing cyanides and formates contained in gasification plant wastewater, comprising:
    (a) removing suspended solids from a gasification plant wastewater stream to create a feed solution;
    (b) adding a sufficient amount of hydrogen peroxide to said feed solution in order to oxidize cyanides and formates contained in said feed solution; and
    (c) irradiating said feed solution containing said oxidant with sufficient ultraviolet light in order to substantially reduce cyanides and formates contained in said feed solution,
    wherein pH is not intentionally adjusted to aid said method, and
    wherein the initial formate ion concentration in said gasification plant wastewater is less than about 5,000 mg/L and the initial cyanide ion concentration in said gasification plant wastewater is less than about 20 mg/L, and
    wherein the minimum molar ratio of oxidant per mole of formate ion in said gasification plant wastewater stream is about 1.0 and the minimum molar ratio of oxidant per mole of cyanide ion in said gasification plant wastewater stream is about 5.0, and
    wherein the effluent formate ion concentration is less than about 50 mg/L and the effluent cyanide ion concentration is less than about 0.2 mg/L.

13. The method of claim 12 wherein steps (b) and (c) occur simultaneously.

* * * * *